(12) United States Patent
Jennings

(10) Patent No.: US 11,988,362 B1
(45) Date of Patent: May 21, 2024

(54) FLEXIBLE SOLAR LAMP

(71) Applicant: Lance Jennings, Bamberg, SC (US)

(72) Inventor: Lance Jennings, Bamberg, SC (US)

( * ) Notice: Subject to any disclaimer, the term of this patent is extended or adjusted under 35 U.S.C. 154(b) by 0 days.

(21) Appl. No.: 18/208,336

(22) Filed: Jun. 12, 2023

(51) Int. Cl.
| | |
|---|---|
| *F21V 15/04* | (2006.01) |
| *F21S 9/03* | (2006.01) |
| *F21V 3/02* | (2006.01) |
| *F21V 7/00* | (2006.01) |
| *F21W 131/109* | (2006.01) |
| *F21Y 115/10* | (2016.01) |

(52) U.S. Cl.
CPC .............. *F21V 15/04* (2013.01); *F21S 9/037* (2013.01); *F21V 3/02* (2013.01); *F21V 7/0066* (2013.01); *F21W 2131/109* (2013.01); *F21Y 2115/10* (2016.08)

(58) Field of Classification Search
CPC ... F21V 15/04; F21W 2131/109; E01F 9/627; E01F 9/623; F21S 8/088
See application file for complete search history.

(56) References Cited

U.S. PATENT DOCUMENTS

| | | | | |
|---|---|---|---|---|
| 4,341,488 | A | * | 7/1982 | Ryan ........................ E01F 9/615 40/608 |
| 4,729,690 | A | | 3/1988 | Lavender et al. |
| 4,955,807 | A | * | 9/1990 | Chance .................... F21S 13/12 428/17 |
| 5,186,119 | A | * | 2/1993 | Hlavin ................ A63C 19/062 33/1 G |
| 5,513,085 | A | | 4/1996 | Bourne |
| 6,386,729 | B1 | | 5/2002 | Bober |
| 8,382,347 | B2 | * | 2/2013 | McCanless ............. F21V 15/01 362/249.02 |
| 8,613,412 | B1 | | 12/2013 | Donaldson |
| 10,401,005 | B1 | | 9/2019 | Gathers et al. |
| 10,745,931 | B1 | | 8/2020 | Gathers et al. |
| 11,384,925 | B1 | | 7/2022 | Zeman et al. |
| 2005/0002183 | A1 | | 1/2005 | Wardzala |
| 2008/0067299 | A1 | * | 3/2008 | Ebel ........................ E01F 9/629 248/548 |
| 2008/0232094 | A1 | * | 9/2008 | Ramsdell ................ F21S 8/088 362/183 |
| 2011/0293367 | A1 | * | 12/2011 | Yeghiayan .............. E01F 9/692 404/72 |
| 2015/0338040 | A1 | * | 11/2015 | Swope .................... F21S 9/037 362/183 |
| 2016/0123032 | A1 | * | 5/2016 | Brodie ...................... F16B 9/09 248/617 |
| 2018/0010308 | A1 | * | 1/2018 | Mandal .................... E01F 9/631 |
| 2020/0279830 | A1 | | 9/2020 | Ayers et al. |
| 2022/0146065 | A1 | * | 5/2022 | Chiang ................... F21V 29/60 |

* cited by examiner

*Primary Examiner* — Tracie Y Green
*Assistant Examiner* — Michael Chiang
(74) *Attorney, Agent, or Firm* — Cramer Patent & Design PLLC; Aaron R. Cramer

(57) ABSTRACT

The flexible solar light may comprise a ground stake, a shock spring, a support post, a light housing, and a housing cap. The flexi-light solar may be an enclosure for a solar lighting system that may recover from a lateral impact by self-righting. Responsive to an impacting force applied to the flexi-light solar, the flexi-light solar may pivot away from the impacting force and then return to an upright position.

1 Claim, 7 Drawing Sheets

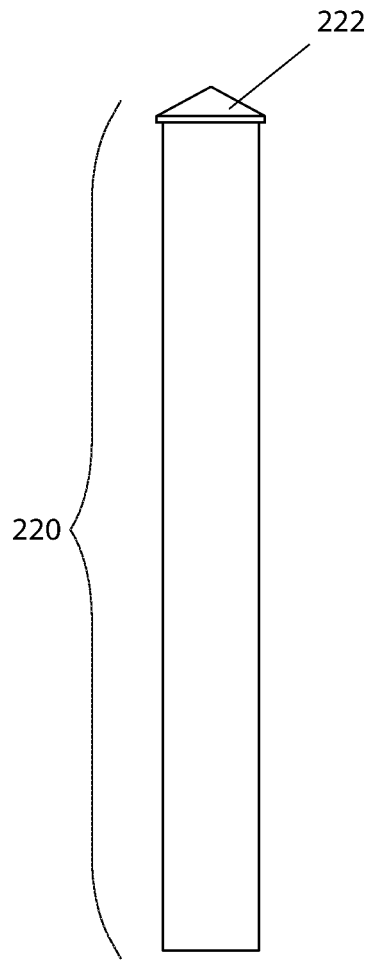
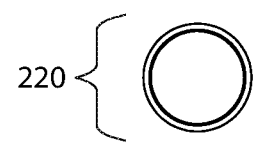
FIG. 5a
FIG. 5b

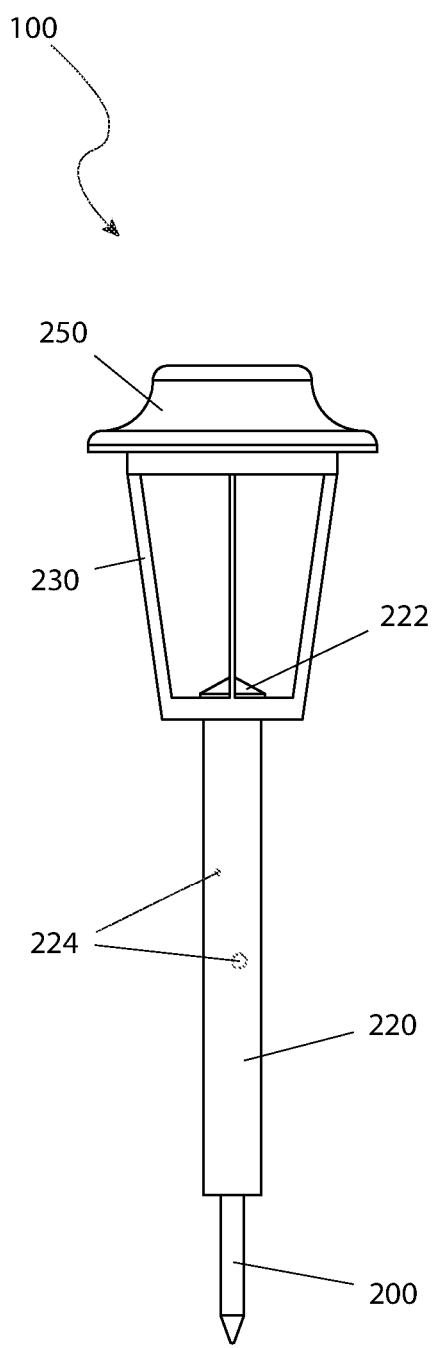
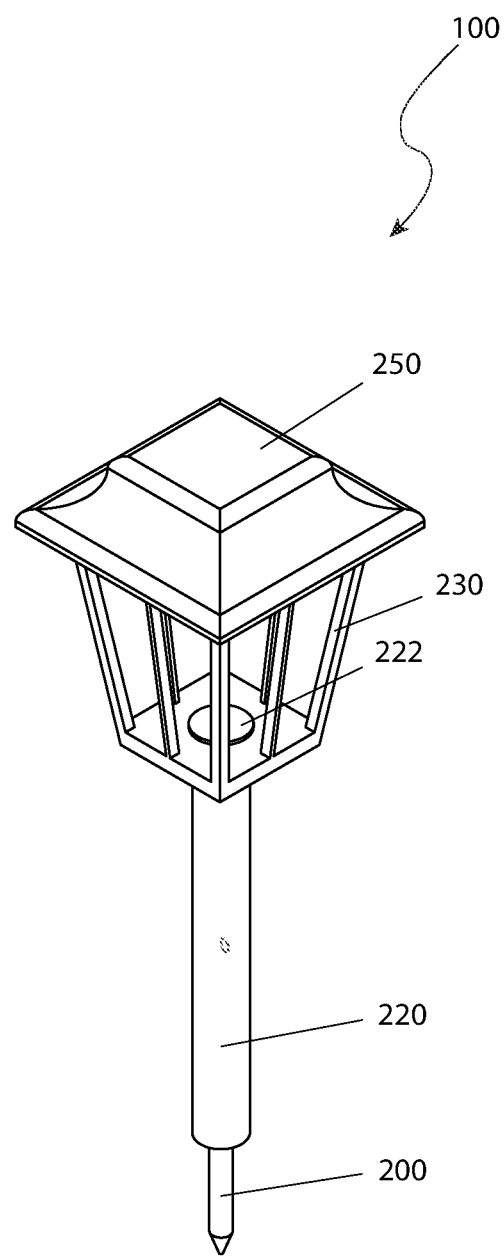
FIG. 6a
FIG. 6b

FLEXIBLE SOLAR LAMP

RELATED APPLICATIONS

None.

FIELD OF THE INVENTION

The present invention relates generally to a lamp and more specifically to a flexible solar lamp.

BACKGROUND OF THE INVENTION

Many individuals in the United States dedicate substantial amounts of time and effort towards the maintenance and enhancement of their lawns and landscapes. For these individuals, tending to their grass, cultivating flowers, shrubs, bushes, and trees is not merely a chore but a source of pride and a way to express their personal taste. They strive to create visually appealing surroundings that enhance the overall aesthetic appeal of their property.

In recent years, one particular product has gained immense popularity among homeowners: solar-powered landscaping lighting. This innovative lighting solution offers not only aesthetic benefits by adding beauty to flower beds, walkways, and lawns but also serves a practical purpose in terms of safety. By harnessing solar energy, these lights eliminate the need for underground wiring and overcome placement restrictions, making them highly versatile and easy to install in various outdoor locations.

However, due to their flexible placement, these lights often come into contact with people, pets, hoses, extension cords, and other objects, which can result in damage to the posts or ground spikes. This frequent need for replacement not only becomes costly but also detracts from the overall aesthetic appeal of the landscape when lights become bent, damaged, or go missing.

Hence, there is a clear need for a solution that protects solar-powered landscape lights from accidental contact, ensuring their durability and maintaining the visual integrity of the landscape. The development of the flexible solar lamp effectively addresses this need in a manner that is efficacious and cost effective.

SUMMARY OF THE INVENTION

Embodiments of the present disclosure may include a flexible solar lamp including a ground stake. Embodiments may also include a shock spring. Embodiments may also include a support post. Embodiments may also include a light housing. Embodiments may also include a housing cap.

In some embodiments, the flexible solar lamp serves as an enclosure for a solar lighting system capable of self-righting after a lateral impact. In some embodiments, the flexible solar lamp pivots away from an impacting force and returns to an upright position. In some embodiments, the ground stake may be pressed into the ground to anchor the flexible solar lamp at a venue.

In some embodiments, the ground stake may include a bottom spike. In some embodiments, the ground stake may include a coupler located at the top of the ground stake with the coupler coupling to the shock spring. In some embodiments, the shock spring may include an upper spring section and a lower spring section.

In some embodiments, the upper spring section has a first diameter larger than a second diameter of the lower spring section. In some embodiments, the shock spring may be coupled at the bottom to the coupler located at the top of the ground stake and at the top fitted into the support post and covered by the support post. In some embodiments, the shock spring may be operable to bend and absorb lateral impact, subsequently straightening to restore the flexible solar lamp to an upright position.

In some embodiments, the support post may include a hollow tube extending downward from the bottom of the light housing via a bottom aperture covering the shock spring. In some embodiments, the support post may include one or more post apertures located in the side of the support post for vacuum breaking, drainage, limiting the range of motion of the shock spring, or any combination thereof.

In some embodiments, the support post may include a post cap positioned at the top end of the support post and located inside the light housing at the center of a bottom panel. In some embodiments, the post cap may be reflective and operable to increase the light emitted by the solar lighting system by reflecting illumination from one or more LED lights.

In some embodiments, the light housing may be capable of serving as an enclosure for directing the light from the solar lighting system. In some embodiments, the light housing may include a top panel, a bottom panel, a plurality of side supports, and a plurality of windows. In some embodiments, the top panel may include an LED aperture allowing illumination from LED lights located in the housing cap to enter the light housing.

In some embodiments, the light housing further has the shape of an inverted truncated pyramid with four trapezoidal sides, a square top, and a square bottom. In some embodiments, the housing cap covers the top of the light housing and may include the solar lighting system. In some embodiments, the flexible solar lamp according to, where the housing cap may include LED lights, a light sensor, a control circuit, and one or more batteries. In some embodiments, the LED lights may be energized to provide illumination, the control circuit monitors ambient light levels, and the batteries serve as a source of electrical energy for the LED lights and control circuit, rechargeable by the solar panel during daylight hours.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5a is a side view of a flexible solar lamp 100, according to an embodiment of the present invention, illustrating the support port 220;

FIG. 5b is a bottom view of a flexible solar lamp 100, according to an embodiment of the present invention, illustrating the support port 220;

FIG. 6a is a side view of a flexible solar lamp 100, according to an embodiment of the present invention;

FIG. 6b is an isometric view of a flexible solar lamp 100, according to an embodiment of the present invention; and, FIG. 7 is an exploded view of a flexible solar lamp 100, according to an embodiment of the present invention.

Figure 1A:
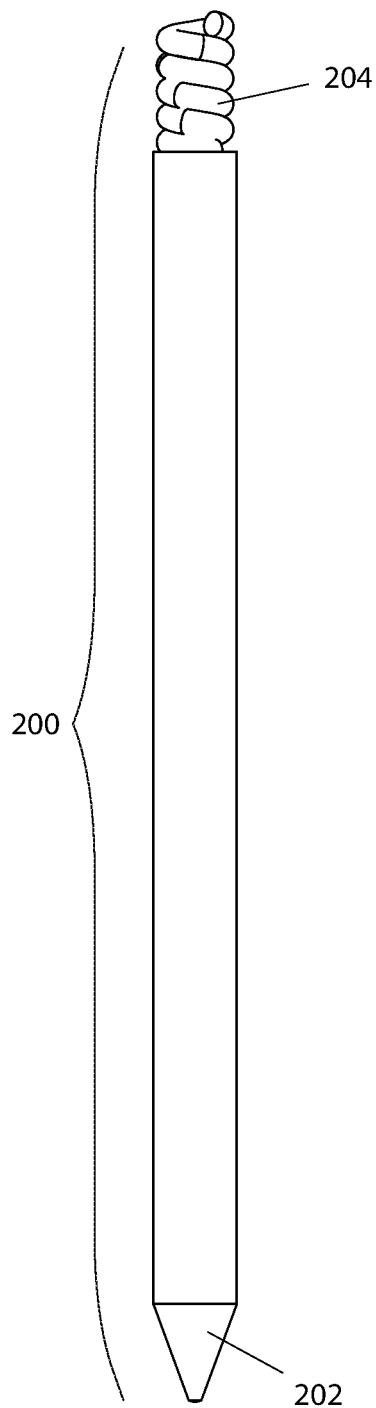
FIG. 1a is a side view of a flexible solar lamp 100, according to an embodiment of the present invention, illustrating the ground stake 200.

DESCRIPTIVE KEY 100 flexible solar lamp
200 ground stake
202 bottom spike
204 coupler
210 shock spring
212 upper spring section
214 lower spring section
216 first diameter
218 second diameter
220 support post
222 post cap
224 post aperture
230 light housing
232 top panel
234 bottom panel
236 side support
238 window
240 LED aperture
242 bottom aperture
250 housing cap

DESCRIPTION OF THE INVENTION

Figure 1B:
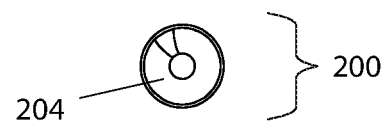
FIG. 1B is a top view of a flexible solar lamp 100, according to an embodiment of the present invention, illustrating the ground stake 200.
Figure 2A:
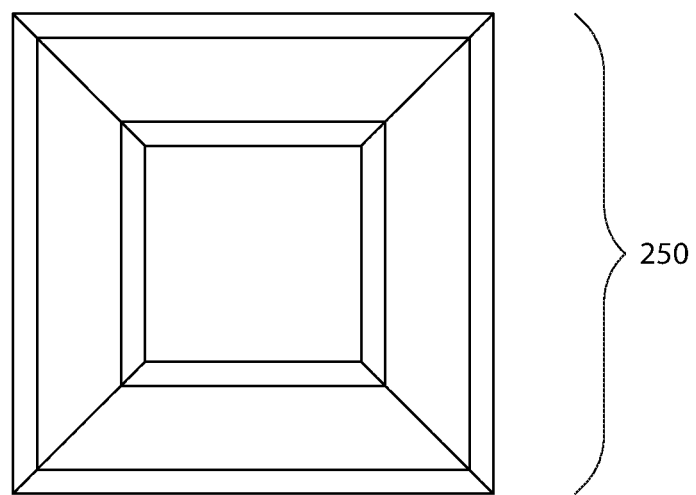
FIG. 2a is a top view of a flexible solar lamp 100, according to an embodiment of the present invention, illustrating the housing cap 250.
Figure 2B:
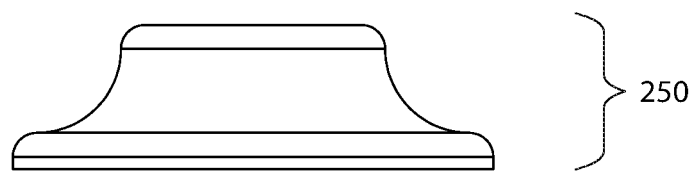
FIG. 2b is a side view of a flexible solar lamp 100, according to an embodiment of the present invention, illustrating the housing cap 250.
Figures 3A, 3B:
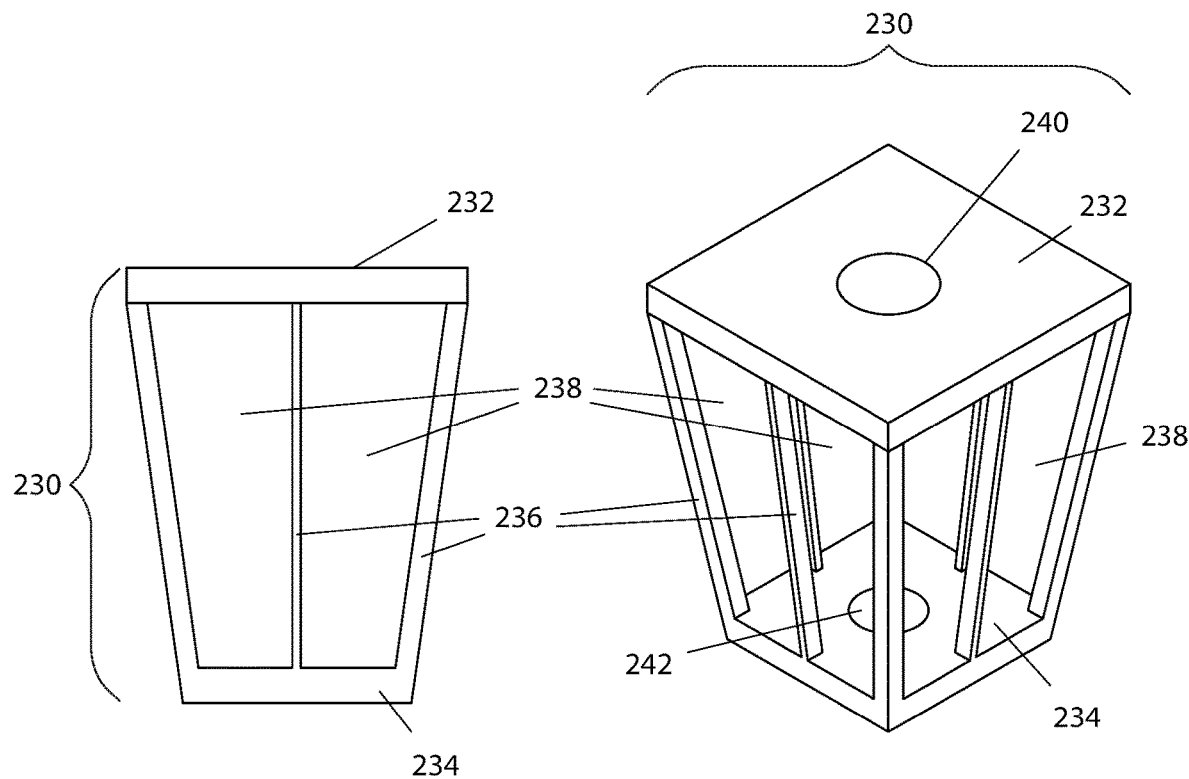
FIG. 3a is a side view of a flexible solar lamp 100, according to an embodiment of the present invention, illustrating the light housing 230.
FIG. 3b is an isometric view of a flexible solar lamp 100, according to an embodiment of the present invention, illustrating the light housing 230.
Figure 3C:
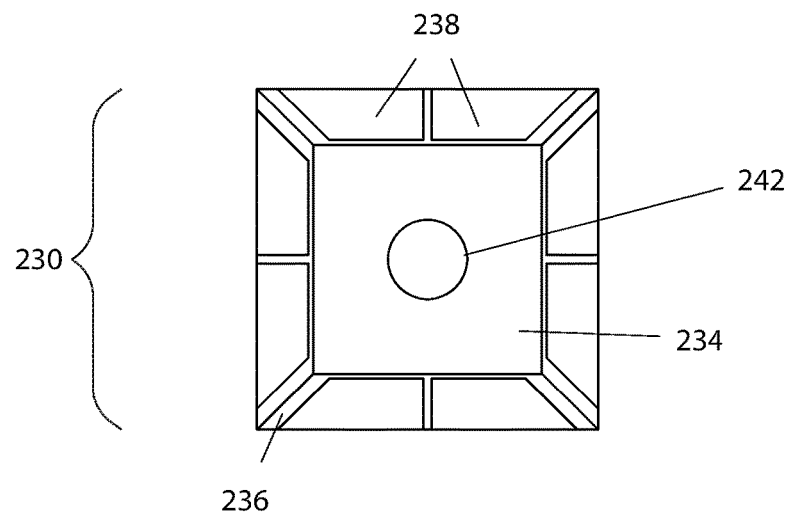
FIG. 3c is a bottom view of a flexible solar lamp 100, according to an embodiment of the present invention, illustrating the light housing 230.
Figure 4A:
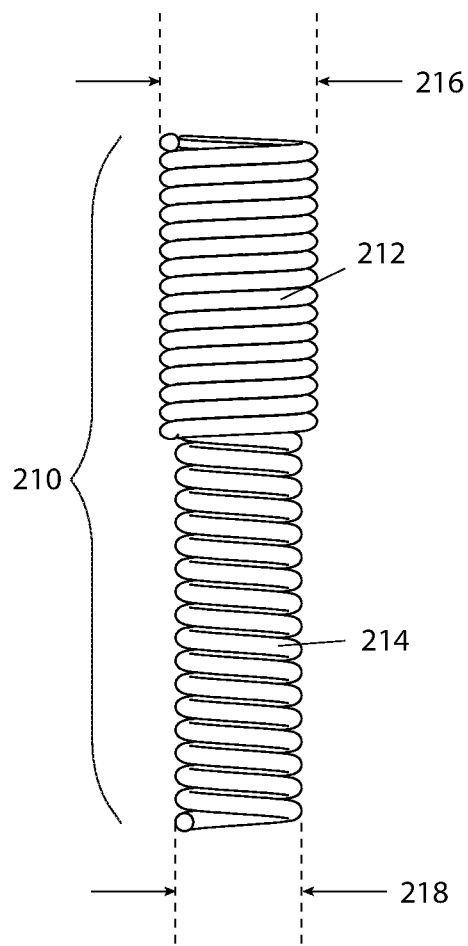
FIG. 4a is a side view of a flexible solar lamp 100, according to an embodiment of the present invention, illustrating the shock spring 210.
Figure 4B:
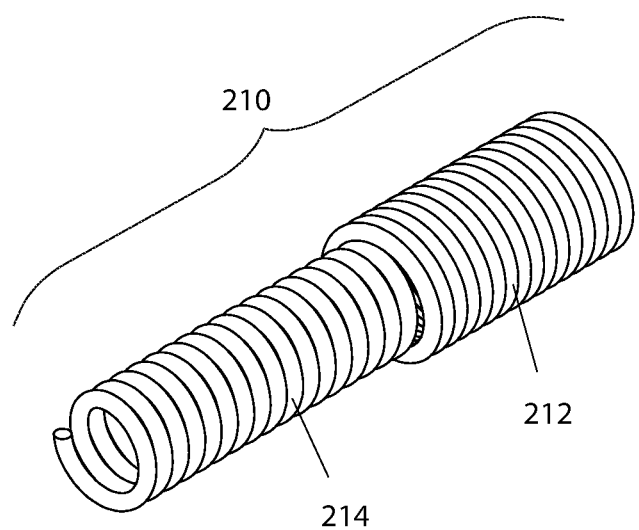
FIG. 4b is an isometric view of a flexible solar lamp 100, according to an embodiment of the present invention, illustrating the shock spring 210.
Figure 4C:
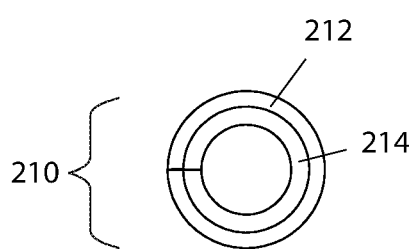
FIG. 4c is a bottom view of a flexible solar lamp 100, according to an embodiment of the present invention, illustrating the shock spring 210.
Figure 7:
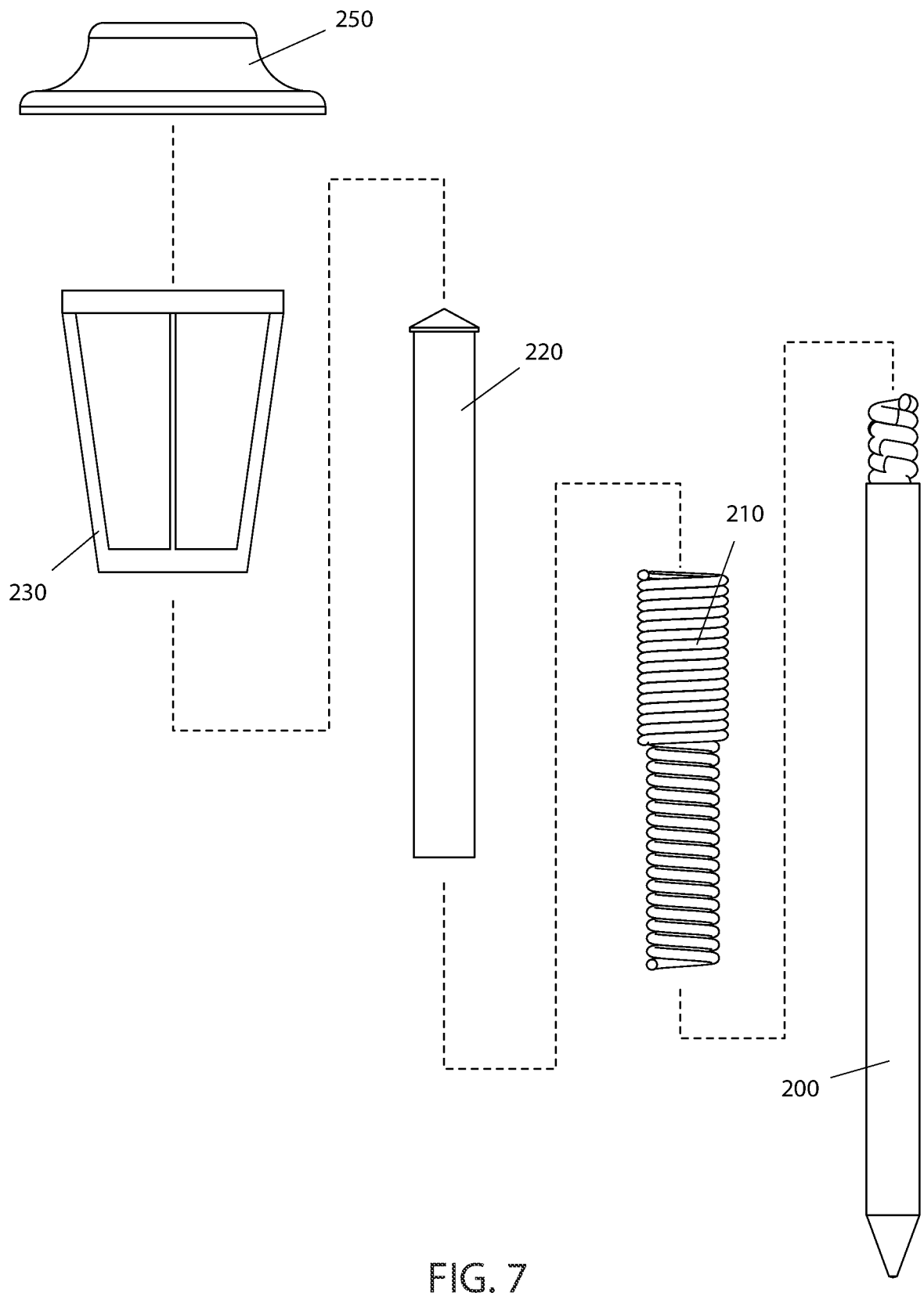

The present invention is directed to a flexible solar lamp 100 (herein described as the "invention" as disclosed in FIGS. 1 through 7) 100. The flexible solar lamp 100 may comprise a ground stake 200, a shock spring 210, a support post 220, a light housing 230, and a housing cap 250. The flexible solar lamp 100 may be an enclosure for a solar lighting system that may recover from a lateral impact by self-righting. Responsive to an impacting force applied to the flexible solar lamp 100, the flexible solar lamp 100 may pivot away from the impacting force and then return to an upright position.

The ground stake 200 may be pressed into the ground to anchor the flexible solar lamp 100 at a venue. The ground stake 200 may comprise a bottom spike 202 to pierce the ground. The ground stake 200 may comprise a coupler 204 at the top of the ground stake 200. The coupler 204 may couple to the shock spring 210.

The shock spring 210 may be a helical spring comprising an upper spring section 212 and a lower spring section 214. A first diameter 216 of the upper spring section 212 may be larger than a second diameter 218 of the lower spring section 214. The bottom of the shock spring 210 may couple to the coupler 204 located at the top of the ground stake 200. The top of the shock spring 210 may fit into the support post 220 and may be covered by the support post 220. The shock spring 210 may be operable to bend to absorb the lateral impact and then straighten to return the flexible solar lamp 100 to the upright position.

The outside diameter of the upper spring section 212 may be smaller than the inside diameter of the support post 220 such that the upper spring section 212 will slide into the bottom of the support post 220. The inside diameter of the lower spring section 214 may match the outside diameter of the coupler 204 such that the coupler 204 may threadedly couple to the bottom of the shock spring 210.

The support post 220 may be a hollow tube that extends downward from the bottom of the light housing 230 via a bottom aperture 242. The support post 220 may cover the shock spring 210. In some embodiments, the support post 220 may comprise one (1) or more post apertures 224 located in the side of the support post 220 for the purpose of vacuum breaking, drainage, limiting the range of motion of the shock spring 210, or any combination thereof.

The support post 220 may comprise a post cap 222 that may be located on the top end of the support post 220. The post cap 222 may be positioned inside of the light housing 230 at the center of a bottom panel 234. In some embodiments, the post cap 222 may be reflective and may be operable to increase the amount of light given off by the solar lighting system by reflecting illumination from one (1) or more LED lights.

The light housing 230 may be an enclosure that directs the light from the solar lighting system. The light housing 230 may comprise a top panel 232, the bottom panel 234, a plurality of side supports 236, and a plurality of windows 238. The top panel 232, the bottom panel 234, and the side supports 236 may give shape to the light housing 230. The windows 238 may allow the light to escape from the light housing 230 and shine onto the ground surrounding the flexible solar lamp 100. The top panel 232 may comprise an LED aperture 240 such that illumination from the LED lights located in the housing cap 250 may enter the light housing 230. The light housing 230 may also serve a decorative purpose. In a preferred embodiment, the light housing 230 may be the shape of an inverted truncated pyramid comprising four trapezoidal sides, a square top, and a square bottom, although other styles and shapes are envisioned to fall under the overall scope of the invention.

The housing cap 250 may cover the top of the light housing 230. In some embodiments, the housing cap 250 may comprise the solar lighting system. As a non-limiting example, the top of the housing cap 250 may be horizontally-oriented and flat such that a solar panel may be coupled to the top of the flexible solar lamp 100. The housing cap 250 may comprise the LED lights, a light sensor, a control circuit, and one (1) or more batteries. The LED lights may be energized to provide illumination surrounding the flexible solar lamp 100. The control circuit may monitor the ambient light level via the light sensor, may control the energization of the LED lights, may monitor the one or more batteries, or any combination thereof. The LED lights may be located on the bottom side of the housing cap 250 such that one (1) or more LED lights may project illumination into the light housing 230. As a non-limiting example, the LED lights may have a color temperature of two thousand seven hundred to six thousand five hundred Kelvin (2700-6500K) corresponding to a range of colors from soft white to daylight white. It is appreciated that the LED lights may comprises any number of colors commonly associated with light projection.

The batteries may comprise one (1) or more energy-storage devices. The batteries may be a source of electrical energy to operate the LED lights and the control circuit. The batteries may be rechargeable and/or replaceable. The solar panel may recharge the batteries during daylight hours.

In use, the ground stake 200 may be driven into the ground and the shock spring 210 may be coupled to the top of the ground stake 200. The support post 220 may be lowered onto the shock spring 210 such that the support post 220, the light housing 230, and the housing cap 250 stand upright above the ground stake 200. If the light housing 230 receives a lateral impact in a way that would otherwise knock other path lights over, the shock spring 210 may flex and slide within the support post 220 such that the flexible solar lamp 100 absorbs the lateral impact. The shock spring 210 may then straighten and slide the opposite direction within the support post 220 such that the flexible solar lamp 100 returns to the upright position.

The exact specifications, materials used, and method of use of the flexible solar lamp 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A flexible solar lamp comprising:
   a ground stake,
   a shock spring,
   a support post,
   a light housing; and,
   a housing cap and,
   wherein the flexible solar lamp serves as an enclosure for a solar lighting system capable of self-righting after a lateral impact;
   wherein the flexible solar lamp pivots away from an impacting force and returns to an upright position;
   wherein the ground stake is configured to be pressed into the ground to anchor the flexible solar lamp at a venue;
   wherein the ground stake comprises a bottom spike;
   wherein the ground stake further comprises a coupler located at the top of the ground stake with said coupler coupling to the shock spring;
   wherein the shock spring comprises an upper spring section and a lower spring section;
   wherein the upper spring section has a first diameter larger than a second diameter of the lower spring section;
   wherein the shock spring is coupled at the bottom to the coupler located at the top of the ground stake and at the top fitted into the support post and covered by the support post;
   wherein the shock spring is operable to bend and absorb lateral impact, subsequently straightening to restore the flexible solar lamp to an upright position;
   wherein the support post comprises a hollow tube extending downward from the bottom of the light housing via a bottom aperture covering the shock spring;
   wherein the support post comprises one or more post apertures located in the side of the support post for vacuum breaking, drainage, limiting the range of motion of the shock spring, or any combination thereof;
   wherein the support post further comprises a post cap positioned at the top end of the support post and located inside the light housing at the center of a bottom panel;
   wherein the post cap is reflective and operable to increase a light emitted by a solar lighting system by reflecting illumination from one or more LED lights;
   wherein the light housing configured to serve as an enclosure for directing the light from the solar lighting system;
   wherein the light housing comprises a top panel, a bottom panel, a plurality of side supports, and a plurality of windows;
   wherein the top panel comprises an LED aperture allowing illumination from LED lights located in the housing cap to enter the light housing;
   wherein the light housing further has the shape of an inverted truncated pyramid with four trapezoidal sides, a square top, and a square bottom;
   wherein the housing cap covers the top of the light housing and comprises the solar lighting system; and
   where the housing cap further comprises LED lights, a light sensor, a control circuit, and one or more batteries, wherein the LED lights are energized to provide illumination, the control circuit monitors ambient light levels, and the batteries serve as a source of electrical energy for the LED lights and control circuit, rechargeable by the solar panel during daylight hours.

\* \* \* \* \*